US010405291B2

(12) United States Patent
Peroulas

(10) Patent No.: US 10,405,291 B2
(45) Date of Patent: Sep. 3, 2019

(54) BASE STATION TIME OFFSET ADJUSTMENT

(71) Applicant: Google LLC, Mountain View, CA (US)

(72) Inventor: James Peroulas, San Mateo, CA (US)

(73) Assignee: Google LLC, Mountain View, CA (US)

(*) Notice: Subject to any disclaimer, the term of this patent is extended or adjusted under 35 U.S.C. 154(b) by 7 days.

(21) Appl. No.: 15/404,262

(22) Filed: Jan. 12, 2017

(65) Prior Publication Data

US 2018/0199296 A1   Jul. 12, 2018

(51) Int. Cl.
*H04W 56/00* (2009.01)
*H04W 72/12* (2009.01)
*H04W 24/02* (2009.01)
*H04W 88/08* (2009.01)

(52) U.S. Cl.
CPC ....... *H04W 56/003* (2013.01); *H04W 56/001* (2013.01); *H04W 72/121* (2013.01); *H04W 24/02* (2013.01); *H04W 88/08* (2013.01)

(58) Field of Classification Search
None
See application file for complete search history.

(56) References Cited

U.S. PATENT DOCUMENTS 8,295,395 B2    10/2012 Mueck et al.
2011/0268018 A1*  11/2011 Wang ................. H04W 56/002
                                                            370/328
2013/0295916 A1   11/2013 Shahid et al.
2014/0362759 A1*  12/2014 Lu ....................... H04W 72/005
                                                            370/312
2016/0170382 A1*   6/2016 Lobo .................... G04C 11/043
                                                            368/47

OTHER PUBLICATIONS

'workspace.winnforum.org' [online] "Signaling Protocols and Procedures for Citizens Broadband Radio Service (CBRS): Spectrum Access Systems (SAS—SAS Interface Technical Specification," Nov. 29, 2016 [retrieved on Jan. 4, 2018] Retrieved from Internet: URL<https://workspace.winnforum.org/higherlogic/ws/public/download/2413/WINNF-15-S-0112-V1.0.0%20CBRS%20Operational%20and%20Functional%20Requirements.pdf> 41 pages.
(Continued)

*Primary Examiner* — Alex Skripnikov
(74) *Attorney, Agent, or Firm* — Fish & Richardson P.C.

(57) ABSTRACT

Methods, systems, and apparatuses, including computer programs encoded on a computer-readable storage medium for providing improved network services to service members are described. A first set of network devices associated with a service membership are identified from among a plurality of network devices. Time offset data that provisions a time displacement from a universal time setting is generated. Synchronization data is transmitted to each device in the first set of network devices associated with the service membership. The synchronization data includes instructions for each device in the first set of network devices to offset the universal time setting at the device according to the generated time offset data.

19 Claims, 3 Drawing Sheets

(56) References Cited

OTHER PUBLICATIONS

'www.aventasinc.com' [online] "Timing and Synchronization for LTE-TDD and LTE-Advanced Mobile Networks," Aug. 10, 2015, [retrieved on Jan. 4, 2018] via Wayback Machine Internet Archive at Internet: URLhttps://web.archive.org/web/20150815000000/https://www.aventasinc.com/whitepapers/WP-Timing-Sync-LTE-SEC.pdf 9 pages.

'www.gps.gov' [online "Telecom Requirements for Time and Frequency Synchronization," Jan. 8, 2017, retrieved on Jan. 4, 2018] via the Wayback Machine Internet Archive at Internet URL<https://web.archive.org/web/20170601000000/https://www.gps.gov/cgsic/meetings/2012/weiss1.pdf> 36 pages.

'www.mathworks.com' [online] "LTD Downlink Channel Estimation and Equalization," Jul. 20, 2016, [retrieved on Jan. 4, 2018] via the Wayback Machine Internet Archive at Internet: URL<http://web.archive.org/web/20160720053822/https://www.mathworks.com/help/lte/examples/lte-downlink-channel-estimation-and-equalization.html> 5 pages.

International Search Report and Written Opinion issued in International Application No. PCT/US2017/056717, dated Jan. 29, 2018, 8 pages.

Yokote et al. "High-precision Clock-time-synchronization Network Equipment for Introduction of 3.5-GH1 band TD-LTE," NTT DOCOMO Technical Journal, vol. 18(2) Oct. 31, 2016, 9 pages.

* cited by examiner

BASE STATION TIME OFFSET ADJUSTMENT

BACKGROUND

A Citizens Broadband Radio Service (CBRS) alliance, which includes a limited number of technology companies, has been created to facilitate access to long term evolution (LTE)-based services. The CBRS band, which is located between 3.55 GHz and 3.7 GHz, is available to members of the CBRS alliance as well as non-members of the CBRS alliance. However, members of the CBRS alliance may experience interference in their CBRS services by non-members, thereby degrading CBRS use and access for CBRS alliance members.

SUMMARY

In general, innovative aspects of the subject matter described in this specification can be embodied in a computer-implemented method. The method includes determining, by one or more computing devices, a first set of network devices, from among a plurality of network devices, that are associated with a service membership that allows for sharing of data for time synchronization. The method also includes generating, by the one or more computing devices, time offset data that provisions a time displacement from a universal time setting, and transmitting, by the one or more computing devices, synchronization data to each device in the first set of network devices associated with the service membership. The synchronization data includes instructions for each device in the first set of network devices to offset the universal time setting at the device according to the generated time offset data.

In some implementations, the method further includes receiving, from each of the devices in the first set of network devices, a digital certificate indicative of a service membership of the device, and storing data that identifies one or more devices in the plurality of network devices from which the digital certificate is received as being associated with the service membership.

In some implementations, the plurality of network devices includes a plurality of base stations in a wireless network.

In some implementations, the operation of generating, by the one or more computing devices, the time offset data that provisions the time displacement from the universal time setting includes generating a seed value. The operation of transmitting, by the one or more computing devices, the synchronization data to each device in the first set of network devices associated with the service membership includes transmitting the seed value and instructions to utilize the seed value as an input to a random number generator. The service membership includes a Citizens Broadband Radio Service membership.

In some implementations, the method further includes storing a mapping table in a storage database. The mapping table includes a time offset value and a time in the universal time setting to transmit the time offset value. The universal time setting includes a global positioning system time value.

In some implementations, the operation of generating, by the one or more computing devices, the time offset data that provisions the time displacement from the universal time setting includes obtaining a time offset value from the mapping table. The operation of transmitting, by the one or more computing devices, the synchronization data to each device in the first set of network devices associated with the service membership includes transmitting the time offset value obtained from the mapping table.

In some implementations, the method further includes determining that one or more criteria for updating the time offset data is satisfied, generating a second time offset data that provisions a second time displacement from the universal time setting, and transmitting, by the one or more computing devices, second synchronization data to each device in the first set of network devices associated with the service membership. The second synchronization data includes instructions for each device in the first set of network devices to offset the universal time setting at the device according to the generated second time offset data.

In some implementations, the operation of determining that the one or more criteria for updating the time offset data is satisfied includes determining that an expiration time of the time offset data in the universal time setting has occurred, or determining that a time period during which the time offset data is valid is complete.

Other aspects include corresponding methods, systems, apparatus, computer-readable storage mediums, and computer programs configured to implement the actions of the above-noted methods.

The above-noted aspects and implementations further described in this specification may offer several advantages. For example, the controlled distribution of time offset data only to base stations that are associated with CBRS alliance members reduces interferences in communication between devices using base stations having CBRS alliance membership. The reduction in interferences may provide better-quality communications such as fewer instances of dropped calls and compromised data. In addition, non-CBRS alliance members may have an incentive to join the CBRS alliance to experience improved LTE services.

The details of one or more aspects described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This disclosure generally relates to spectrum access allocation processes and systems that provide benefits for CBRS alliance members. The CBRS band is available in the S-band and can be accessed by users through a three-tier shared Spectrum Access System (SAS) framework. The three-tiers include: Incumbent Access, Priority Access, and General Authorized Access (GAA). The Incumbent Access tier provides access to restricted authorized users and may not be open for access to users of the Priority Access and GAA tiers. To access the Priority Access tier, users must obtain a Priority Access License (PAL) and bid for a 10 MHz channel between 3.55 GHz and 3.65 GHz. The GAA tier provides more open and flexible access to users relative to the Incumbent Access and Priority Access tier. A user in the GAA tier may access any portion of the spectrum between 3.55 GHz and 3.7 GHz that is not being utilized by a user of a higher tier, for example, Priority Access. The three-tiered SAS framework provides a dynamic method of handling the increasing number of wireless devices seeking broadband network access through an efficient use and allocation of available spectrum.

Systems and methods described in this written description improve communications between network devices associated with CBRS alliance members by minimizing interference from network devices that are not associated with CBRS alliance members by use of time synchronization.

Time synchronization between base stations ensures quality LTE communications, and is generally provided by setting the clocks of each of the base stations to a Global Positioning System (GPS) time. However, as the number and variation of devices communicating in the CBRS band increases and the number of non-CBRS alliance members having access to the CBRS increases, communication between the base stations may be unsynchronized. This lack of synchronization results in low data rates, dropped calls, and increased signal interferences.

To address this time synchronization issue, a controlled and dynamic time offset can be generated and provided to base stations associated with CBRS alliance members. These base stations may set their clocks according to the dynamic time offset and may perform wireless LTE communications using the dynamic time offset. Base stations associated with CBRS alliance members may therefore have the latest coordinated time offset data to synchronize the clocks of the base stations. Base stations that are not associated with CBRS alliance members are not provided with the latest time offset data and may perform wireless communications without synchronization, but the wireless communication functions will not perform with the benefit of time synchronization.

Exemplary implementations are described with reference to the figures.

Figure 1:
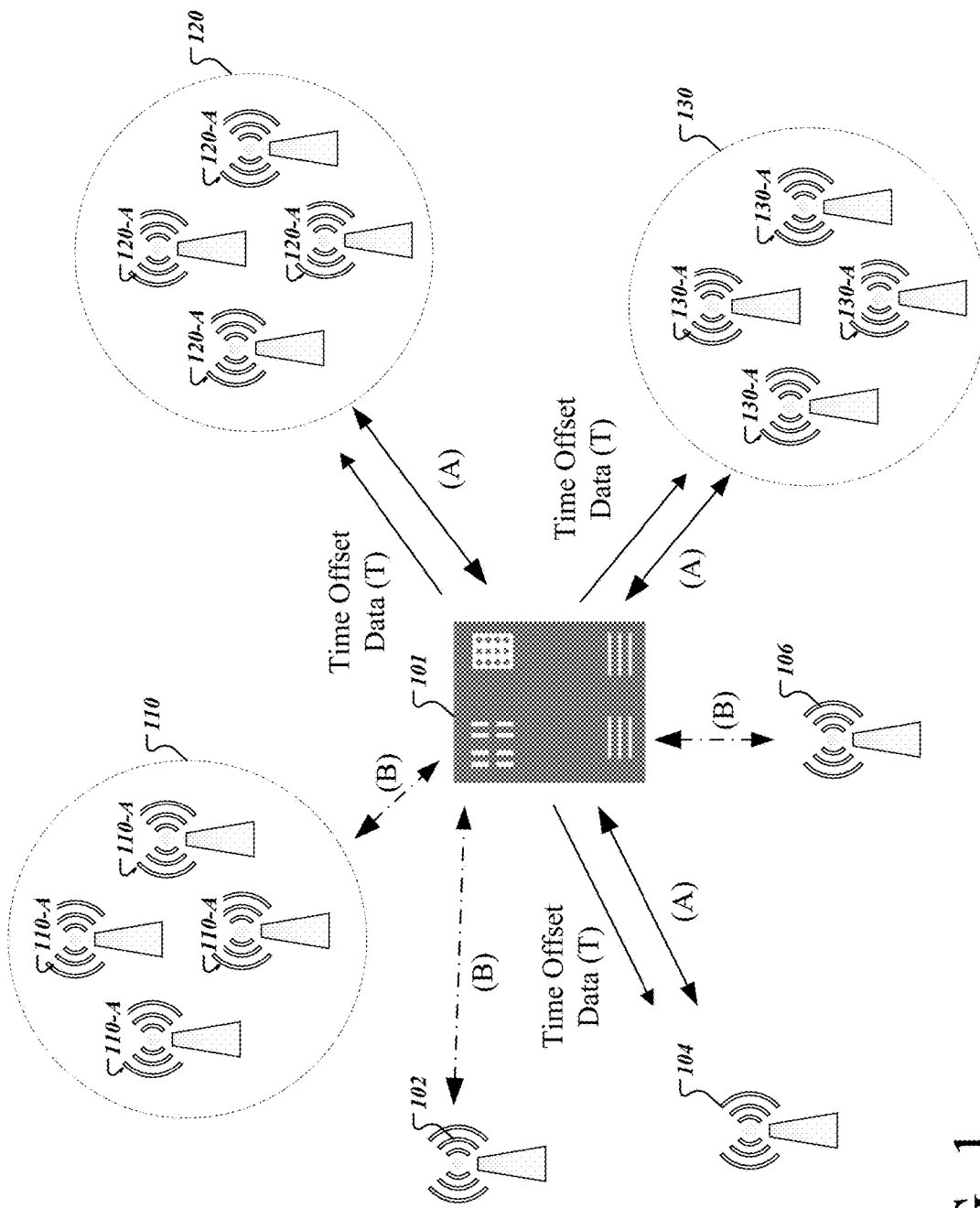
FIG. 1 depicts an exemplary system with CBRS member and non-member network devices.

FIG. 1 depicts an exemplary system with one or more wireless networks that include a server 101 connected to a plurality of base stations 102, 104, 106, and sets of base stations 110, 120, 130. Although only one server 101 is shown in FIG. 1, the server 101 may be implemented as a plurality of servers. Details of the server 101 are described below with respect to FIG. 3.

A base station provides wireless communications and connectivity between devices and base stations. A base station may connect a number of electronic user devices to one another, may connect electronic user devices to another network, such as a wide area network (WAN) or a local area network (LAN), and may connect base stations to one another. In some cases, a base station may be used to provide cellular and Internet services, and may transmit data to other base stations and user devices. The base stations may be evolved base stations used for LTE communications.

Each of the base stations 102, 104, 106, 110-A, 120-A, 130-A in FIG. 1 may include various hardware and software components including, but not limited to, a transceiver and a GPS module. The transceiver may be used to transmit and receive wireless data to and from other devices. The GPS module may communicate with satellites and GPS control stations via the transceiver to receive GPS location and time information. For example, a GPS time at the location of the base station according to atomic clocks may be provided to the GPS module from a GPS control station or satellite. The GPS module may then utilize the GPS time and set the base station clock based, at least in part, on the atomic time provided to the GPS module. In some implementations, a base station may include a pseudorandom number generator that can generate a random number based on a seed value.

FIG. 1 depicts sets of base stations 110, 120, 130. Each of base stations 110-A, 120-A, and 130-A respectively included in the sets of base stations 110, 120, 130 may be associated with a company or a particular service provider, for example, a wireless communications network provider. In some cases, the service provider or company may have access to the time synchronization services described below. The time synchronization services may be provided to entities that agree to receives such services. The entities may, in some situations, agree to such services based on a membership with other entities. One example entity that may have such access is a CBRS alliance member. Other types of agreements for entities may also be used to provide the time synchronization services. Generally, such an entity is referred to as a "Service member." For example, in FIG. 1, base station sets 120 and 130 are operated or controlled by a Service member whereas base station set 110 is not operated or controlled by a Service member. Individual base stations may also be associated or unassociated with a Service member. For example, in FIG. 1, base station 104 is operated or controlled by a Service member whereas base stations 102 and 106 are not operated or controlled by a Service member.

Base stations 104, 120-A, 130-A that are associated with a Service member may be subject to a number of privileges and restrictions. For example, a base station associated with a Service member may not be permitted to select channels for data communication and may be bound to channels selected for the base station by the server 101. However, the base station may be granted certain privileges such as receiving synchronization data that provisions wireless communications with less interference. Base stations with no Service membership are not granted such privileges.

Server 101 may obtain information to identify the base stations 104 or sets of base stations 120, 130 that are associated with a Service member. Server 101 may generate time offset data and send the time offset data to all the base stations 104, 120-A, 130-A that are associated with a Service member (T). Base stations 102, 106, 110-A that are not associated with a Service member do not receive any time offset data from the server 101.

After receiving the time offset data, each of the base stations 104, 120-A, 130-A that are associated with a Service member may set the base station clock according to the time offset data. As a result, base stations 102, 106, and 110-A may have clocks that are still unsynchronized or linked to the atomic clock, whereas base stations 104, 120-A, 130-A have clocks that are synchronized according to the time offset data. Because base stations 104, 120-A, 130-A associated with Service members have synchronized clocks, wireless communications (A) between these base stations may have enhanced quality compared to wireless communications (B) with base stations 102, 106, and 110-A that are not associated with a Service member and are subject to greater interference.

In some cases, the base stations 104, 120-A, 130-A that are associated with a Service member may set their clocks instantaneously according to the time offset data. In some cases, the base stations 104, 120-A, 130-A that are associated with a Service member may set their clocks in a slewed manner such that the time offset is gradually attained at a particular slew rate. For example, a time offset of 50 milliseconds may be achieved at a slew rate of 10 milliseconds in offset per second. In some cases, settings specifying the slew rate may be provided in the time offset data. In some implementations, a base station may be configured to implement a slew rate.

Figure 2:
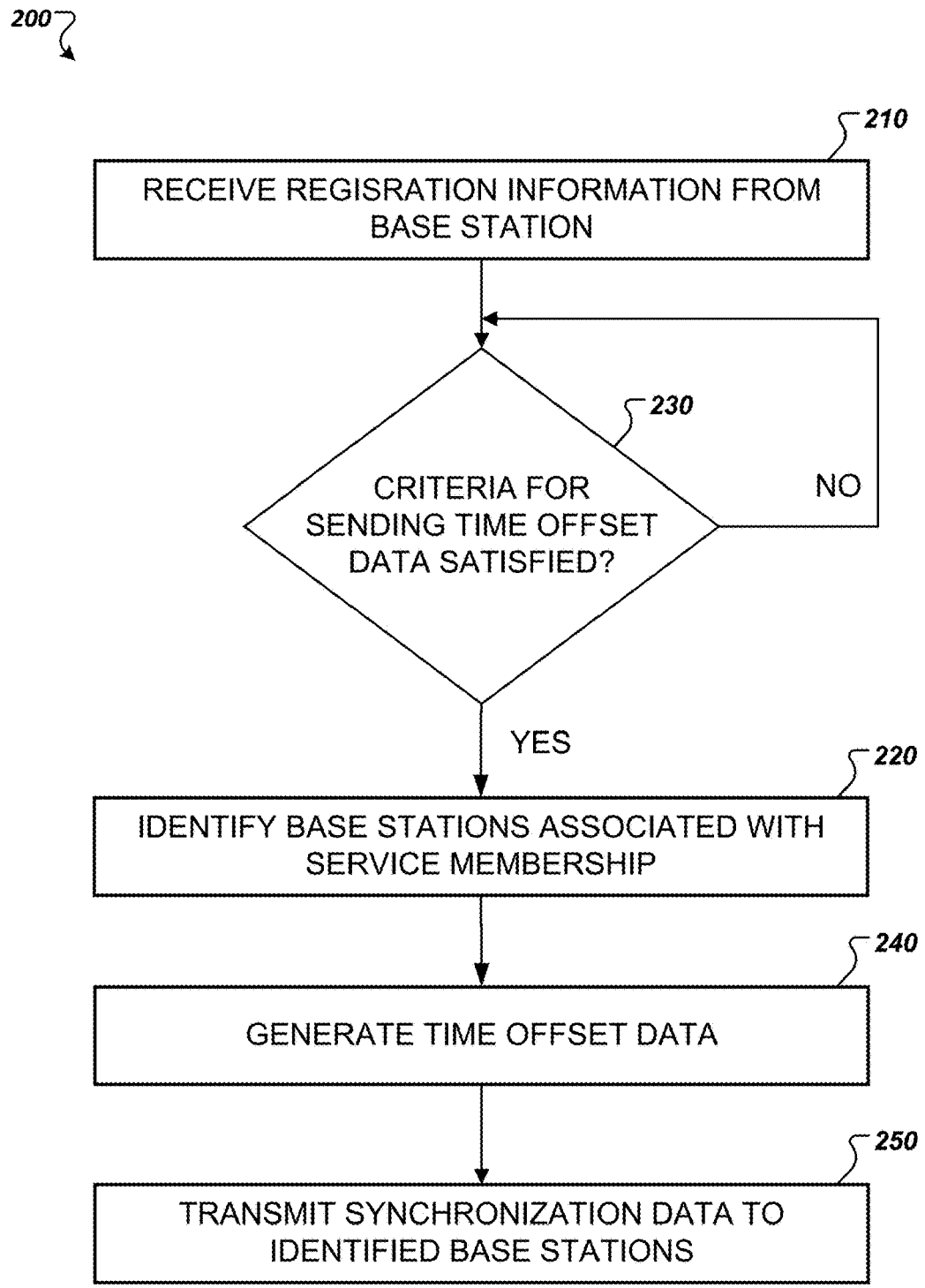
FIG. 2 depicts an exemplary flow diagram of a method for implementing time offset adjustment.

FIG. 2 depicts an exemplary flow diagram of a method 200 for implementing time offset adjustment. The operations in method 200 depicted by FIG. 2 may be executed by server 101.

The server 101 may receive a message that includes registration information from a base station associated with a Service member (210). The registration information may include information identifying the base station and a Service member that the base station is associated with. For example, the registration information may include one or more of a unique identifier or name of the base station, GPS coordinates of the base station, network address, for example, an Internet Protocol (IP) address or Media Access Control (MAC) address, of the base station, and a digital certificate. The digital certificate may include a certified key or signature that authenticates the base station's association with a particular Service member.

The server 101 may maintain or communicate with a database to store registration information of the base stations. The stored registration information may be used to determine which base stations are associated with a Service member. In some cases, identification information identifying a particular Service member that a base station is associated with may be stored. In some cases, the identity of the particular Service member may be anonymized and is replaced with a general indicator that a base station is associated with a Service member without identifying the particular Service member. A base station may be associated with a Service member if the base station is deployed by, controlled by, operated by, or managed by a Service member, and possesses a digital certificate verifying its association with a Service member.

Next, the server 101 may determine whether the criteria for sending time offset data is satisfied (220). The time offset data may be configured to be updated according to one or more rules. For example, in some cases, time offset data may be sent each time a new base station is added to one or more networks provisioning CBRS spectral access. In some cases, time offset data may be valid for a particular period of time (e.g., 10 milliseconds), and upon expiration of the period of time, new time offset data may be sent. In some cases, new time offset data may be sent at a particular time of the day, week, month, or year. In general, the time offset data may vary as a function of time.

In some cases, time offset data may be sent in an incremental manner according to a transmission schedule. For example, if time offset data noting a time offset of 50 microseconds is to be provided to base stations, time offset data specifying a time offset of 10 microseconds may be sent after a particular period of time (e.g., 15 milliseconds) over five periods such that after five periods, the receiving base stations have information for a time offset of 50 microseconds. In another example, time offset data specifying a time offset of five microseconds may be sent after a particular period of time (e.g., five milliseconds) over two periods such that after two periods, the receiving base stations have information for a tie offset of ten microseconds.

If the criteria for sending time offset data according to the one or more rules are not satisfied, the server 101 may not take any further action and may wait until the criteria is satisfied. If the criteria are satisfied, the server 101 identifies one or more base stations that are associated with a Service member (220). The server 101 may identify the base stations associated with a Service member using the registration information stored in a database as described above.

The server 101 may generate time offset data using one or more protocols described below (240). Time offset data provides information that can be used to offset GPS time at a base station. For example, the time offset data may provision time displacement from an atomic time. The time offset data may include a time value or a seed, as described below.

In some implementations, the server 101 may generate a random seed, which may refer to a random number or vector used to initialize a random or pseudorandom number generator. Base stations having a random or pseudorandom number generator and using the same random number algorithms can use the generated seed as an input to generate matching output values.

In some implementations, the server 101 may obtain time offset data from a mapping table. Various types of mapping table may be used. For example, in some cases, the mapping table may include information identifying a particular time offset to be provided at a particular time, for instance at a particular second, minute, hour. In some cases, the mapping table may include information identifying a particular time offset to be provided during a particular time period, for instance, during a particular day, week, or year. In some cases, the mapping table may include information identifying a particular time offset and an expiration time for the particular time offset.

In some implementations, the particular time offset may be a time displacement from the GPS time or atomic time. In some implementations, the particular time offset may be a time displacement from a previously-specified time offset at the base stations. For example, if at a first time, a time offset value of 0.02 seconds was provided to offset base station clocks by 0.02 seconds from the atomic time, the second time offset value provided at a second time may include an offset value of 0.01 seconds to displace the base station clocks by 0.03 seconds from the atomic time.

After generating the time offset data, the server 101 may transmit synchronization data to the base stations identified in operation 220 (250). When the time offset value used is a seed value, the synchronization data may include the seed value and instructions for a receiving base station to utilize the seed value as an input to a random or pseudorandom number generator. When a mapping table is used to obtain time offset data, the synchronization data may include a time displacement value and additional information, such an expiration time for the time displacement value.

The operations depicted in FIG. 2 may be repeated any time that the criteria for sending time offset data is satisfied. For example, if the time offset value is configured to be updated every week, a week after providing synchronization data as described above, another time offset value may be obtained and sent as synchronization data to the base stations associated with a Service member. In this manner, base stations associated with Service members are able to communicate in a synchronized manner using time offset data that varies with time.

Figure 3:
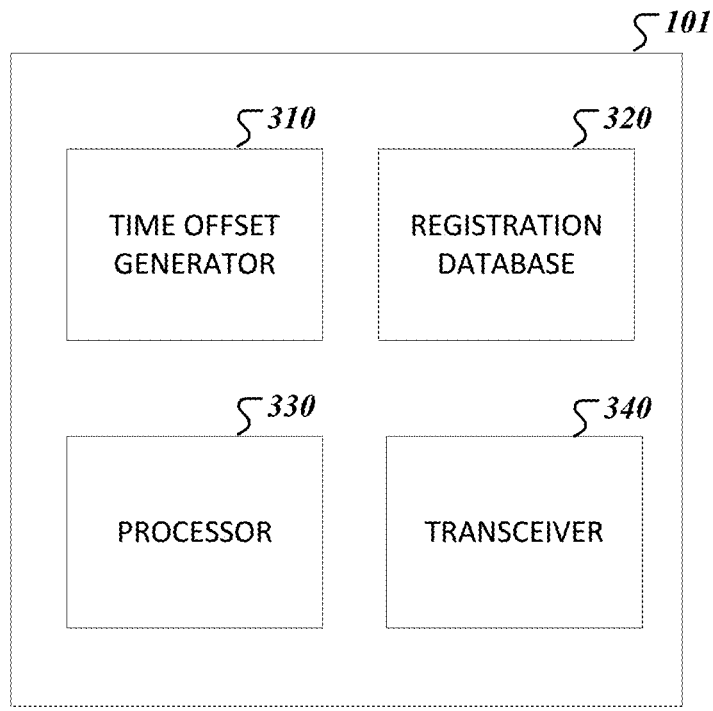
FIG. 3 depicts an exemplary block diagram of a server used for providing time offset adjustment.

FIG. 3 depicts an exemplary block diagram of server 101 used for providing time offset adjustment. Although only one server 101 is shown in FIGS. 1 and 3, the server 101 may be implemented as a plurality of servers and various components of the server 101 may be distributed across the plurality of servers. In some cases, server 101 may be a spectrum access system (SAS) server. Server 101 includes a time offset generator 310, a registration database 320, a processor 530, and a transceiver 340.

Registration database 320 may include one or more mass storage devices, for example, magnetic, magneto optical disks, optical disks, EPROM, EEPROM, flash memory devices, and may be implemented as internal hard disks, removable disks, magneto optical disks, CD ROM, or DVD-ROM disks for storing data. The registration database 320 may store registration data that registers base station registration information, base station Service membership information, and a mapping table that maps time offset values to one or more time parameters, as described above.

The registration database 320 may include a cloud database or a database managed by a database management system (DBMS). A DBMS may be implemented as an engine that controls organization, storage, management, and retrieval of data in a database. DBMSs frequently provide the ability to query, backup and replicate data, enforce rules, provide security, do computation, perform change and access logging, and automate optimization. A DBMS typically includes a modeling language, data structure, database query language, and transaction mechanism. The modeling language is used to define the schema of each database in the DBMS, according to the database model, which may include a hierarchical model, network model, relational model, object model, or some other applicable known or convenient organization. Data structures can include fields, records, files, objects, and any other applicable known or convenient structures for storing data. A DBMS may also include metadata about the data that is stored.

Transceiver 340 includes a transmitter and a receiver and may be utilized to communicate with devices connected to the server 101. The transceiver 340 may include amplifiers, modulators, demodulators, antennas, and various other components. The transceiver 340 may transfer or route data between devices connected to the server 101. The transceiver 340 may direct data received from devices connected to the server 101 to other components of the server 101 such as the processor 330 or the time offset generator 310. The transceiver 340 may also direct data received from components of the server 101 to devices connected to the server 101.

The time offset generator 310 may generate a seed value or obtain time offset data from a mapping table in the registration database 320. The time offset generator may convert the seed value or time offset data obtained from the mapping table to a message to be transmitted via transceiver 340 to one or more base stations associated with a Service member.

The time offset generator 310 and the processor 330 may be implemented separately or integrated as one entity. The processor 330 may include one or more processors coupled to all components of the server 101, and may control the operations of the server 101. The processor 530 may include various logic circuitry and programs to execute the various implementations described herein. Processor 530 may include general and special purpose microprocessors.

If server 101 is implemented over one or more servers, the one or more servers may be connected by one or more networks. The one or more servers may implement one or more operations of the method 200 for providing and adjusting time offset data described above. The one or more servers may include any suitable computing device coupled to the one or more networks, including but not limited to a personal computer, a server computer, a series of server computers, a mini computer, and a mainframe computer, or combinations thereof. For example, the one or more servers may include a web server (or a series of servers) running a network operating system. In some implementations, the one or more servers may be connected to or may be integrated with one or more databases, such as registration database 320.

The one or more servers may also implement common and standard protocols and libraries, such as the Secure Sockets Layer (SSL) protected file transfer protocol, the Secure Shell File Transfer Protocol (SFTP)-based key management, and the NaCl encryption library. The one or more servers may be used for and/or provide cloud and/or network computing. Although not shown in the figures, the one or more servers may have connections to external systems providing messaging functionality such as e-mail, SMS messaging, text messaging, and other functionalities, such as encryption/decryption services, cyber alerts, etc.

The one or more networks may provide network access, data transport, and other services to the server 101 and the base stations. Although the implementations above have been described with respect to LTE networks, the one or more networks may include and implement any commonly defined network architectures including those defined by standards bodies, such as the Global System for Mobile communication (GSM) Association, the Internet Engineering Task Force (IETF), and the Worldwide Interoperability for Microwave Access (WiMAX) forum. For example, the one or more networks may implement one or more of a GSM architecture, a General Packet Radio Service (GPRS) architecture, and a Universal Mobile Telecommunications System (UMTS) architecture. The one or more networks may implement a WiMAX architecture defined by the WiMAX forum or a Wireless Fidelity (WiFi) architecture. The one or more networks may include, for instance, a local area network (LAN), a wide area network (WAN), the Internet, a virtual LAN (VLAN), an enterprise LAN, a layer 3 virtual private network (VPN), an enterprise IP network, corporate network, or any combination thereof. In some implementations, the one or more networks may include a cloud system that provides Internet connectivity and other network-related functions.

The above examples have been described in the context of base stations associated with Service members. However, the method of providing and adjusting time offset data described herein can be applied to various types of network devices such as hubs, bridges, switches, routers, modems, and user devices, for example, phones, pads, and computers.

Embodiments and all of the functional operations and/or actions described in this specification may be implemented in digital electronic circuitry, or in computer software, firmware, or hardware, including the structures disclosed in this specification and their structural equivalents, or in combinations of one or more of them. Embodiments may be implemented as one or more computer program products, for example, one or more modules of computer program instructions encoded on a computer readable medium for execution by, or to control the operation of, data processing apparatus. The computer-readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, for example, code that constitutes processor firmware, a protocol stack, a database management system, an operating system, or a combination of one or more of them. A propagated signal is an artificially generated signal, for example, a machine-generated electrical, optical, or electromagnetic signal that is generated to encode information for transmission to a suitable receiver apparatus.

A computer program, also known as a program, software, software application, script, or code, may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data in a single file dedicated to the program in question, or in multiple coordinated files. A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry, for example, an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. A processor may include any suitable combination of hardware and software.

Elements of a computer may include a processor for performing instructions and one or more memory devices for storing instructions and data. Generally, a computer will also include, or be operatively coupled to receive data from or transfer data to, or both, one or more mass storage devices for storing data, for example, magnetic, magneto optical disks, or optical disks. Moreover, a computer may be embedded in another device, for example, a user device. Computer-readable media suitable for storing computer program instructions and data include all forms of non-volatile memory, media and memory devices, including by way of example semiconductor memory devices, for example, EPROM, EEPROM, and flash memory devices; magnetic disks, for example, internal hard disks or removable disks; magneto optical disks; and CD ROM and DVD-ROM disks. The processor and the memory may be supplemented by, or incorporated in, special purpose logic circuitry.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and may even be claimed as such, one or more features from a claimed combination may in some cases be excised from the combination, and the claimed combination may be directed to a sub-combination or variation of a sub-combination.

Similarly, while actions are depicted in the drawings in a particular order, this should not be understood as requiring that such actions be performed in the particular order shown or in sequential order, or that all illustrated actions be performed, to achieve desirable results. Moreover, the separation of various system components in the embodiments described above should not be understood as requiring such separation in all embodiments, and it should be understood that the described program components and systems may generally be integrated together in a single software product or packaged into multiple software products.

It should be understood that the phrase one or more of and the phrase at least one of include any combination of elements. For example, the phrase one or more of A and B includes A, B, or both A and B. Similarly, the phrase at least one of A and B includes A, B, or both A and B.

Thus, particular implementations have been described. Other implementations are within the scope of the following claims. For example, the actions recited in the claims may be performed in a different order and still achieve desirable results.

What is claimed is:

1. A computer-implemented method comprising:
   determining, by one or more computing devices, a first set of multiple network devices, from among a plurality of network devices, that are associated with a service membership that allows for sharing of data for time synchronization;
   generating, by the one or more computing devices, time offset data that provisions a time displacement from a universal time setting for each network device in the first set; and
   transmitting, by the one or more computing devices, synchronization data to each device in the first set of network devices associated with the service membership, the synchronization data including instructions for each device in the first set of network devices to offset the universal time setting at the device according to the generated time offset data;
   storing a mapping table in a storage database, the mapping table including a time offset value and a time in the universal time setting to transmit the time offset value,
   wherein the universal time setting includes a global positioning system time value.

2. The computer-implemented method of claim 1, further comprising:
   receiving, from each of the devices in the first set of network devices, a digital certificate indicative of a service membership of the device; and
   storing data that identifies one or more devices in the plurality of network devices from which the digital certificate is received as being associated with the service membership.

3. The computer-implemented method of claim 1, wherein:
   the plurality of network devices includes a plurality of base stations in a wireless network.

4. The computer-implemented method of claim 1, wherein:
   generating, by the one or more computing devices, the time offset data that provisions the time displacement from the universal time setting comprises obtaining the time offset value from the mapping table; and transmitting, by the one or more computing devices, the synchronization data to each device in the first set of network devices associated with the service membership comprises transmitting the time offset value obtained from the mapping table.

5. A computer-implemented method comprising:
determining, by one or more computing devices, a first set of network devices, from among a plurality of network devices, that are associated with a service membership that allows for sharing of data for time synchronization;
generating, by the one or more computing devices, time offset data that provisions a time displacement from a universal time setting, in part, by generating a seed value; and
transmitting, by the one or more computing devices, synchronization data to each device in the first set of network devices associated with the service membership, the synchronization data including the seed value, instructions to utilize the seed value as an input to a random number generator, and instructions for each particular device in the first set of network devices to offset the universal time setting at the particular device according to the time offset data.

6. The computer-implemented method of claim 5, wherein the service membership is a Citizens Broadband Radio Service membership.

7. A computer-implemented method comprising:
determining, by one or more computing devices, a first set of multiple network devices, from among a plurality of network devices, that are associated with a service membership that allows for sharing of data for time synchronization;
generating, by the one or more computing devices, time offset data that provisions a time displacement from a universal time setting for each network device in the first set; and
transmitting, by the one or more computing devices, synchronization data to each device in the first set of network devices associated with the service membership, the synchronization data including instructions for each device in the first set of network devices to offset the universal time setting at the device according to the generated time offset data;
determining that one or more criteria for updating the time offset data is satisfied;
generating a second time offset data that provisions a second time displacement from the universal time setting; and
transmitting, by the one or more computing devices, second synchronization data to each device in the first set of network devices associated with the service membership, the second synchronization data including instructions for each device in the first set of network devices to offset the universal time setting at the device according to the generated second time offset data;
wherein determining that the one or more criteria for updating the time offset data is satisfied comprises:
determining that an expiration time of the time offset data in the universal time setting has occurred; or
determining that a time period during which the time offset data is valid is complete.

8. A system comprising:
one or more computing devices and one or more storage devices storing instructions which when executed by the one or more computing devices, cause the one or more computing devices to perform operations comprising:
determining a first set of multiple network devices, from among a plurality of network devices, that are associated with a service membership that allows for sharing of data for time synchronization;
generating time offset data that provisions a time displacement from a universal time setting for each network device in the first set; and
transmitting synchronization data to each device in the first set of network devices associated with the service membership, the synchronization data including instructions for each device in the first set of network devices to offset the universal time setting at the device according to the generated time offset data;
storing a mapping table in a storage database, the mapping table including a time offset value and a time in the universal time setting to transmit the time offset value,
wherein the universal time setting includes a global positioning system time value.

9. The system of claim 8, wherein the operations further comprise:
receiving, from each of the devices in the first set of network devices, a digital certificate indicative of a service membership of the device; and
storing data that identifies one or more devices in the plurality of network devices from which the digital certificate is received as being associated with the service membership.

10. The system of claim 8, wherein:
generating the time offset data that provisions the time displacement from the universal time setting comprises obtaining the time offset value from the mapping table; and
transmitting the synchronization data to each device in the first set of network devices associated with the service membership comprises transmitting the time offset value obtained from the mapping table.

11. A system comprising:
one or more computing devices and one or more storage devices storing instructions which when executed by the one or more computing devices, cause the one or more computing devices to perform operations comprising:
determining a first set of network devices, from among a plurality of network devices, that are associated with a service membership that allows for sharing of data for time synchronization;
generating time offset data that provisions a time displacement from a universal time setting, in part, by generating a seed value; and
transmitting synchronization data to each device in the first set of network devices associated with the service membership, the synchronization data including the seed value, instructions to utilize the seed value as an input to a random number generator, and instructions for each particular device in the first set of network devices to offset the universal time setting at the particular device according to the time offset data.

12. The system of claim 11, wherein the service membership is a Citizens Broadband Radio Service membership.

13. A system comprising:
one or more computing devices and one or more storage devices storing instructions which when executed by the one or more computing devices, cause the one or more computing devices to perform operations comprising:
determining a first set of multiple network devices, from among a plurality of network devices, that are associated with a service membership that allows for sharing of data for time synchronization;
generating time offset data that provisions a time displacement from a universal time setting for each network device in the first set; and
transmitting synchronization data to each device in the first set of network devices associated with the service membership, the synchronization data including instructions for each device in the first set of network devices to offset the universal time setting at the device according to the generated time offset data;
determining that one or more criteria for updating the time offset data is satisfied;
generating a second time offset data that provisions a second time displacement from the universal time setting; and
transmitting second synchronization data to each device in the first set of network devices associated with the service membership, the second synchronization data including instructions for each device in the first set of network devices to offset the universal time setting at the device according to the generated second time offset data,
wherein determining that the one or more criteria for updating the time offset data is satisfied comprises:
determining that an expiration time of the time offset data in the universal time setting has occurred; or
determining that a time period during which the time offset data is valid is complete.

14. One or more non-transitory computer-readable storage media comprising instructions, which, when executed by one or more computing devices, cause the one or more computing devices to perform operations comprising:
determining a first set of multiple network devices, from among a plurality of network devices, that are associated with a service membership that allows for sharing of data for time synchronization;
generating time offset data that provisions a time displacement from a universal time setting for each network device in the first set; and
transmitting synchronization data to each device in the first set of network devices associated with the service membership, the synchronization data including instructions for each device in the first set of network devices to offset the universal time setting at the device according to the generated time offset data;
storing a mapping table in a storage database, the mapping table including a time offset value and a time in the universal time setting to transmit the time offset value, and wherein the universal time setting includes a global positioning system time value.

15. The one or more non-transitory computer-readable storage media of claim 14, wherein the operations further comprise:
receiving, from each of the devices in the first set of network devices, a digital certificate indicative of a service membership of the device; and
storing data that identifies one or more devices in the plurality of network devices from which the digital certificate is received as being associated with the service membership.

16. The one or more non-transitory computer-readable storage media of claim 14, wherein:
generating the time offset data that provisions the time displacement from the universal time setting comprises obtaining the time offset value from the mapping table; and
transmitting the synchronization data to each device in the first set of network devices associated with the service membership comprises transmitting the time offset value obtained from the mapping table.

17. One or more non-transitory computer-readable storage media comprising instructions, which, when executed by one or more computing devices, cause the one or more computing devices to perform operations comprising:
determining a first set of network devices, from among a plurality of network devices, that are associated with a service membership that allows for sharing of data for time synchronization;
generating time offset data that provisions a time displacement from a universal time setting, in part, by generating a seed value; and
transmitting synchronization data to each device in the first set of network devices associated with the service membership, the synchronization data including the seed value, instructions to utilize the seed value as an input to a random number generator, and instructions for each particular device in the first set of network devices to offset the universal time setting at the particular device according to the time offset data.

18. The one or more non-transitory computer-readable storage media of claim 17, wherein the service membership is a Citizens Broadband Radio Service membership.

19. One or more non-transitory computer-readable storage media comprising instructions, which, when executed by one or more computing devices, cause the one or more computing devices to perform operations comprising:
determining a first set of multiple network devices, from among a plurality of network devices, that are associated with a service membership that allows for sharing of data for time synchronization;
generating time offset data that provisions a time displacement from a universal time setting for each network device in the first set; and
transmitting synchronization data to each device in the first set of network devices associated with the service membership, the synchronization data including instructions for each device in the first set of network devices to offset the universal time setting at the device according to the generated time offset data;
determining that one or more criteria for updating the time offset data is satisfied;
generating a second time offset data that provisions a second time displacement from the universal time setting; and
transmitting second synchronization data to each device in the first set of network devices associated with the service membership, the second synchronization data including instructions for each device in the first set of network devices to offset the universal time setting at the device according to the generated second time offset data, wherein determining that the one or more criteria for updating the time offset data is satisfied comprises:
determining that an expiration time of the time offset data in the universal time setting has occurred; or
determining that a time period during which the time offset data is valid is complete.

\* \* \* \* \*

UNITED STATES PATENT AND TRADEMARK OFFICE
CERTIFICATE OF CORRECTION

PATENT NO. : 10,405,291 B2  
APPLICATION NO. : 15/404262  
DATED : September 3, 2019  
INVENTOR(S) : James Peroulas Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 117 days.

Signed and Sealed this
Second Day of June, 2020

Andrei Iancu
*Director of the United States Patent and Trademark Office*